US012770752B2

(12) United States Patent
Johnson

(10) Patent No.: US 12,770,752 B2
(45) Date of Patent: Oct. 20, 2026

(54) STORAGE CONTAINER FOR URANIUM OXIDE POWDER

(71) Applicant: FRAMATOME, Courbevoie (FR)

(72) Inventor: Gannon Johnson, Pasco, WA (US)

(73) Assignee: FRAMATOME, Courbevoie (FR)

( * ) Notice: Subject to any disclaimer, the term of this patent is extended or adjusted under 35 U.S.C. 154(b) by 424 days.

(21) Appl. No.: 18/516,897

(22) Filed: Nov. 21, 2023

(65) Prior Publication Data

US 2025/0166859 A1 May 22, 2025

(51) Int. Cl.
*G21F 5/06* (2006.01)
*G21C 19/40* (2006.01)
*G21C 21/02* (2006.01)

(52) U.S. Cl.
CPC ............... *G21F 5/06* (2013.01); *G21C 19/40* (2013.01); *G21C 21/02* (2013.01)

(58) Field of Classification Search
CPC ............ G21F 5/06; G21C 19/40; G21C 21/02
See application file for complete search history.

(56) References Cited

U.S. PATENT DOCUMENTS

| | | | | |
|---|---|---|---|---|
| 2004/0071254 A1* | 4/2004 | Malalel | G21F 5/08 | 376/272 |
| 2005/0224729 A1* | 10/2005 | Tamaki | G21F 5/00 | 250/507.1 |
| 2008/0069291 A1* | 3/2008 | Singh | G21F 5/008 | 376/272 |
| 2016/0314863 A1* | 10/2016 | Singh | G21F 5/06 | |
| 2023/0082559 A1* | 3/2023 | Eidelpes | G21F 5/12 | 250/507.1 |

* cited by examiner

*Primary Examiner* — David E Smith
(74) *Attorney, Agent, or Firm* — Davidson Kappel LLC

(57) ABSTRACT

A storage container for uranium oxide powder, comprising a drum having a central axis; an insert comprising several tubes extending in respective directions parallel to the central axis, fastened to the drum and located inside the drum; and neutron absorbing bodies housed inside the tubes.

11 Claims, 3 Drawing Sheets

STORAGE CONTAINER FOR URANIUM OXIDE POWDER

The present disclosure concerns a storage container for uranium oxide powder used for nuclear fuel manufacturing.

BACKGROUND

Such storage containers are widely used in nuclear fuel manufacturing facilities. Existing containers are adapted to the storage and handling of uranium oxide powder with an enrichment less than or equal to 5 wt % $^{235}U$.

However, it is presently considered using uranium oxide powder with a higher enrichment for nuclear fuel manufacturing.

When existing containers are loaded with uranium oxide powder with an enrichment exceeding 5 wt % $^{235}U$, nuclear criticality safety becomes an issue.

As a consequence, there is a need for a safe and economic storage container of enriched uranium oxide powder used for nuclear fuel manufacturing with an enrichment exceeding 5 wt % $^{235}U$.

SUMMARY

Hence, it is an object of the present disclosure to provide a storage container for uranium oxide powder, comprising:
- a drum having a central axis;
- an insert comprising several tubes extending in respective directions parallel to the central axis, fastened to the drum and located inside the drum
- neutron absorbing bodies housed inside the tubes.

The storage container may present one or several of the following features:
- the neutron absorbing bodies are made of an elastomeric material;
- the neutron absorbing bodies are made of a mixture of polyethylene with boron carbide powder;
- a boron content of the neutron absorbing bodies and a spacing between the tubes in a plane perpendicular to the central axis are chosen such that uranium oxide powder with an enrichment of up to 6.5 wt % $^{235}U$ can be accommodated inside the storage container with no nuclear criticality safety issue;
- the insert comprises a bottom plate to which respective first ends of the tubes are fastened;
- the first end of each tube is open;
- several openings are arranged through the bottom plate, the first end of each tube being fastened around one of the openings such that an inner space of the tube is accessible through said one of the openings;
- each tube has a second end opposite the first end along the central axis, the second end being closed;
- the bottom plate has an upper large face to which the tubes are fastened and a lower large face opposite the upper large face, the lower large face laying flat on a bottom wall of the drum, the bottom wall closing the openings;
- the drum has a cylindrical side wall with opposite first and second open ends along the central axis and a lid closing the second open end, the bottom wall closing the first open end, the tubes extending toward the lid along directions parallel to the central axis;
- the bottom plate is secured to the bottom wall by screws.

DETAILED DESCRIPTION

Figure 1:
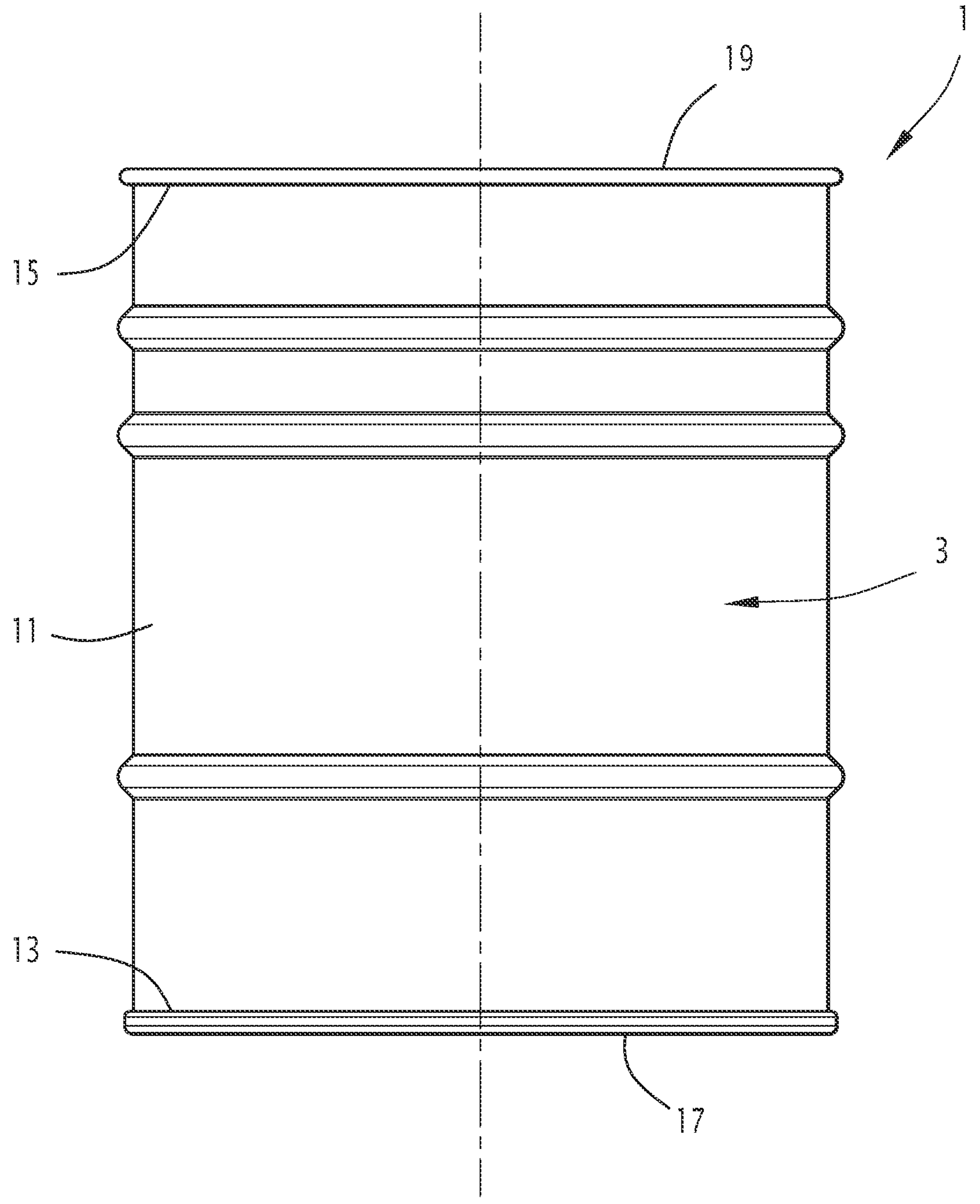
FIG. 1 is a side view of a storage container according to the present disclosure.
Figure 2:
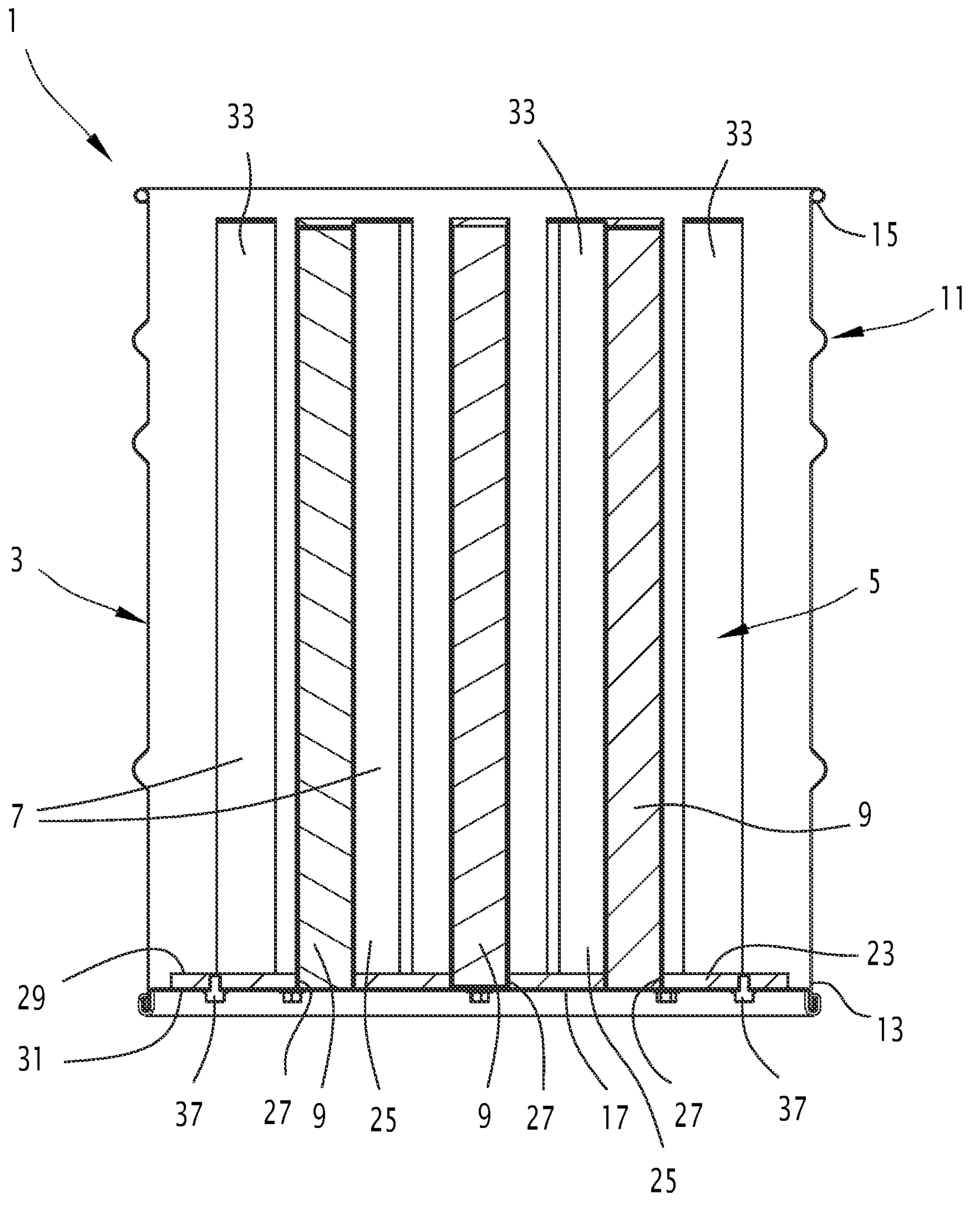
FIG. 2 is a cross sectional side view, taken along the line II-II of the FIG. 1.

The container 1 illustrated on the FIG. 1 is for the storage of uranium oxide powder used for nuclear fuel manufacturing.

The powder is mainly made of $UO_2$.

The storage container 1 is intended for the storage, handling and transportation inside a nuclear fuel manufacturing facility.

The storage container 1 comprises:
- a drum 3 having a central axis C;
- an insert 5 comprising several tubes 7 extending in respective directions parallel to the central axis C, fastened to the drum 3 and located inside the drum 3;
- neutron absorbing bodies 9 housed inside the tubes 7.

The drum 3 comprises a cylindrical side wall 11 with opposite first and second open ends 13, 15 along the central axis C, a bottom wall 17 closing the first open end 13, and a lid 19 closing the second open end 15.

The drum 3 is for example a custom 45-gallon drum, which is designed to meet the MIL specification. The MIL specification is a US Military standard for drum containers, including specifications for drum strength and integrity.

The cylindrical side wall 11 has a circular section perpendicularly to the central axis C.

The bottom wall 17 is secured to cylindrical side wall 11 by all adapted means (welding, etc). The connection between the bottom wall 17 and the cylindrical side wall 11 is leakproof, with possibly a sealant ring arranged between the bottom wall 17 and the cylindrical side wall 11.

The lid 19 lid is removably mounted on the second open end 15, for example by mean of a clamping collar.

A sealant ring 21 (FIG. 3) is arranged between the lid 19 and the cylindrical side wall 11.

The sealant ring 21 is made of an elastomeric material. For example, it is made of butyl rubber.

The insert 5 is made of steel or stainless steel.

The insert 5 comprises a bottom plate 23 to which respective first ends 25 of the tubes 7 are fastened.

The bottom plate 23 is flat and has an outer section, considered perpendicularly to the central axis C, slightly smaller than the inner section of the drum 3.

The bottom plate 23 can therefore be inserted into and removed from the drum 3 through the second opened end 15.

Several openings 27 are arranged through the bottom plate 23. The openings 27 are cut through the whole thickness of bottom plate 23 and open at both opposite large faces of the bottom plate 23.

The first end 25 of each tube 7 is open.

The first end 25 of each tube 7 is fastened around one of the openings 27 such that an inner space of the tube 7 is accessible through said one of the openings 25 for inserting and removing the neutron absorbing body 9.

The section of the opening 25 is substantially equal to the inner section of the tube 7.

The first end 25 of each tube 7 is fastened by all adapted means, for example by a welding line.

The bottom plate 23 has an upper large face 29 to which the tubes 7 are fastened and a lower large face 31 opposite the upper large face.

The first end 25 of each tube 7 is fastened to the upper large face 29, all the tubes 7 standing on the upper large face 29. In other words, all the tubes 7 are entirely arranged on the side of the upper large face 29, and do not protrude on the side of the lower large face 31.

Each tube 7 has a second end 33 opposite the first end 25 along the central axis C, the second end 33 being closed.

The bottom plate 23 is laying flat on the bottom wall 17.

The bottom wall 17 closes the openings 27 and closes the tubes 7.

The tubes 7 extend from the bottom plate 23 toward the lid 19 along directions parallel to the central axis C.

The second ends 33 of the tubes 7 arrive immediately below the lid 19.

Figure 3:
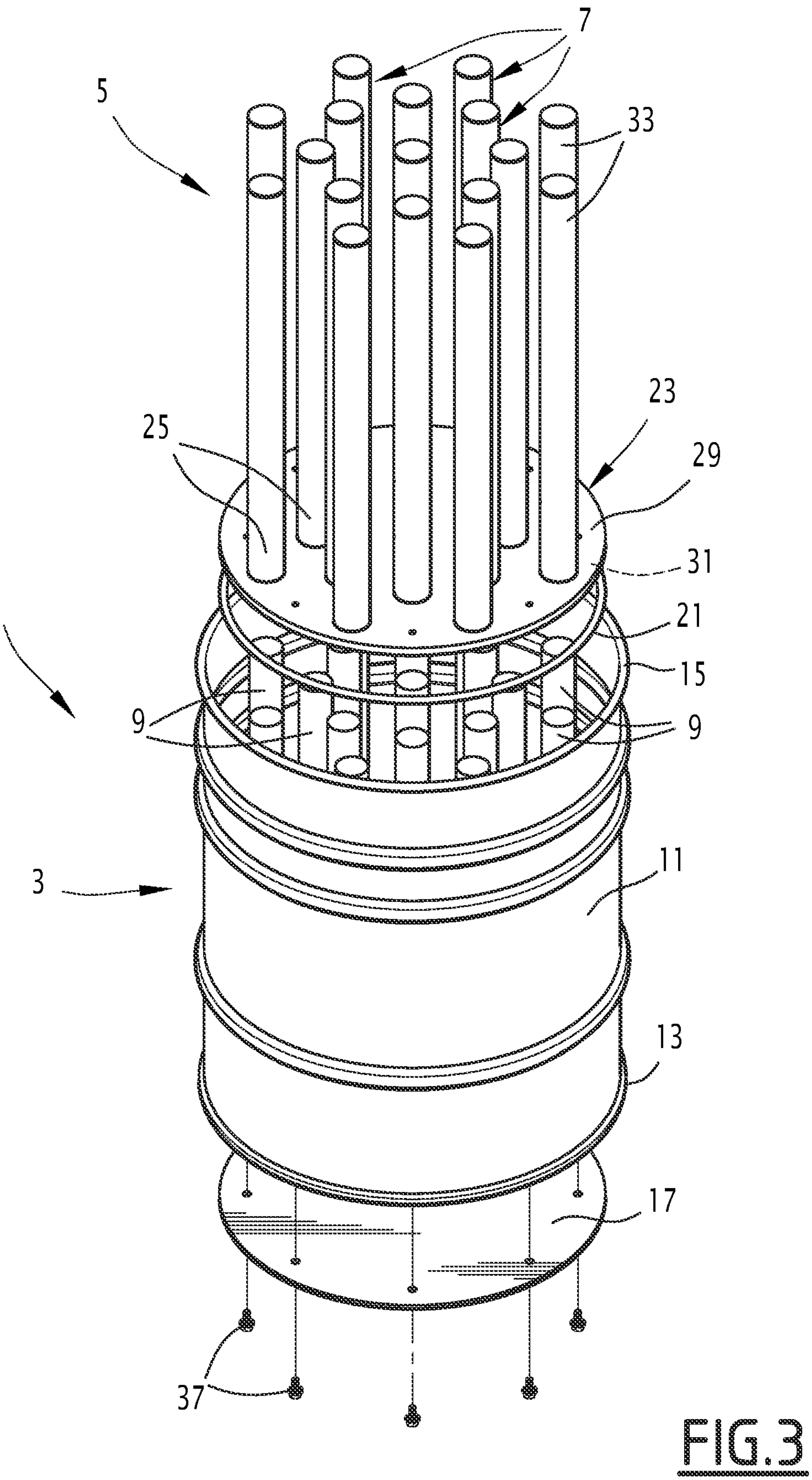
FIG. 3 is an exploded perspective view of the storage container of the FIG. 1, the lid of the drum being omitted.

The bottom plate 23 is secured to the bottom wall 17 removable means such as screws 37 (FIG. 3).

The screws 37 pass through the bottom wall 17 and the bottom plate 23. The screws 37 secure the bottom wall 17 and the bottom plate 23 to one another.

The screws 37 are for example serrated flange head cap screws ⅜-16 UNC×¾ inches long.

The neutron absorbing bodies 9 are made of an elastomeric material.

The elastomeric material contains a homogeneous mixture of boron carbide powder.

For example, the neutron absorbing bodies 9 are made of a mixture of polyethylene with boron carbide powder.

For example, the neutron absorbing bodies 9 comprise 30 wt % of boron carbide, which both moderates fast neutrons from spontaneous fission and absorbs them, keeping uranium stored inside sub-critical.

The neutron absorbing bodies 9 are solid and have respective outer diameters smaller than the diameters of the inner spaces of the tubes 7, typically slightly smaller.

The empty space inside the drum 3, between the tubes 7, is for accommodating the uranium oxide powder.

The boron content of the neutron absorbing bodies 9 and the spacing between the tubes 7 in a plane perpendicular to the central axis is chosen such that uranium oxide powder with an enrichment of up to 6.5 wt % $^{235}U$ can be accommodated inside the storage container 1 with no nuclear criticality safety issue.

There are 16 tubes equally spaced on two concentric circles centered on the central axis of the drum. The inner circle is 10.25 inches in diameter and has 8 tubes, while the outer circle is 17.2 inches in diameter and has 8 tubes equally spaced. There is also a tube located on the central axis of the drum for a total of 17 tubes.

The height of the tubes is 26.25 inches, and the diameter of the tubes is 2 inches.

The interior height of the drum is 27.25 inches, and the inner diameter of the drum is 22.5 inches.

The maximum quantity of uranium oxide powder with an enrichment of up to 6.5 wt % $^{235}U$ can be accommodated inside the container is 200 kg.

The boron carbide content of the neutron absorbing bodies 9, the dimensions of the tubes 7 and the dimensions of the drum 3 can be adapted such that uranium oxide powder with an enrichment higher than 6.5 wt % $^{235}U$ can be accommodated inside the storage container 1 with no nuclear criticality safety issue.

The boron carbide content of the neutron absorbing bodies 9, the dimensions of the tubes 7 and the dimensions of the drum 3 can be adapted such that uranium oxide powder with an enrichment up to 10 wt % $^{235}U$ or even up to 20 wt % $^{235}U$ can be accommodated inside the storage container 1 with no nuclear criticality safety issue.

The insert 5 is also designed to allow the following fuel production operations:

- Loading uranium oxide powder through the top of the drum 3;
- Tumbling of the container 1 for homogenization of the uranium oxide powder, and
- Vacuum transfer of the uranium oxide powder out container through the top of the drum 3

The drum 3 and the insert 5 are also designed such that the container 1 is robust against accidental miss-handling. This container 1 was successfully drop tested in accordance with Military Specification MS27688.

Furthermore, a detailed structural analysis shows the neutron absorbing bodies 9 remain housed in the tubes 7 in the analyzed configuration under upset conditions. The analyzed configuration is the locations of the borated elastomeric cylinders in the drum. The welds should not fail under normal or under abnormal operating conditions.

An improved feature over past designs is that the neutron absorbing bodies 9 can be inspected for degradation using non-destructive means. The insert can be removed from the drum during preventative maintenance and the neutron absorbing bodies 9 inspected.

To remove the insert 5, the screws 37 are unscrewed. The bottom plate 23 and the tubes 7 can then be lifted in one piece out of the drum 3, leaving the neutron absorbing bodies 9 accessible for inspection inside the drum 3, as shown on the FIG. 3.

Prior designs of containers required a destructive test on the oldest drum in the fleet every 5-years.

This present drum has the following advantages:

- it allows the safe storage of higher enrichment UO2 powders;
- it allows easier inspection of material for periodic inspection for criticality control elements;
- it maintains allowance of mixing of powders inside the drum during production by tumbling to ensure homogeneity of the material (i.e. the design of the criticality control weldment does not impede mixing);
- it allows for emptying of material both by inverting the drum into equipment and by a vacuum transfer device in the upright position.

The invention claimed is:

1. A storage container for uranium oxide powder, comprising:
- a drum having a central axis;
- an insert comprising several tubes extending in respective directions parallel to the central axis, fastened to the drum and located inside the drum; and
- neutron absorbing bodies housed inside the tubes.

2. The storage container according to claim 1, wherein the neutron absorbing bodies are made of an elastomeric material.

3. The storage container according to claim 1, wherein the neutron absorbing bodies are made of a mixture of polyethylene with boron carbide powder.

4. The storage container according to claim 3, wherein a boron content of the neutron absorbing bodies and a spacing between the tubes in a plane perpendicular to the central axis are chosen such that uranium oxide powder with an enrichment of up to 6.5 wt % $^{235}U$ can be accommodated inside the storage container with no nuclear criticality safety issue.

5. The storage container according to claim 1, wherein the insert comprises a bottom plate to which respective first ends of the tubes are fastened.

6. The storage container according to claim 5, wherein the first end of each tube is open.

7. The storage container according to claim 5, wherein several openings are arranged through the bottom plate, the first end of each tube being fastened around one of the openings such that an inner space of the tube is accessible through said one of the openings.

8. The storage container according to claim 5, wherein each tube has a second end opposite the first end along the central axis, the second end being closed.

9. The storage container according to claim 5, wherein the bottom plate has an upper large face to which the tubes are fastened and a lower large face opposite the upper large face, the lower large face laying flat on a bottom wall of the drum, the bottom wall closing the openings.

10. The storage container according to claim 9, wherein the drum has a cylindrical side wall with opposite first and second open ends along the central axis and a lid closing the second open end, the bottom wall closing the first open end, the tubes extending toward the lid along directions parallel to the central axis.

11. The storage container according to claim 10, wherein the bottom plate is secured to the bottom wall by screws.

* * * * *